Aug. 22, 1950 A. H. TAYLOR 2,519,413
OSCILLOSCOPE SWEEP CIRCUIT
Filed July 25, 1946
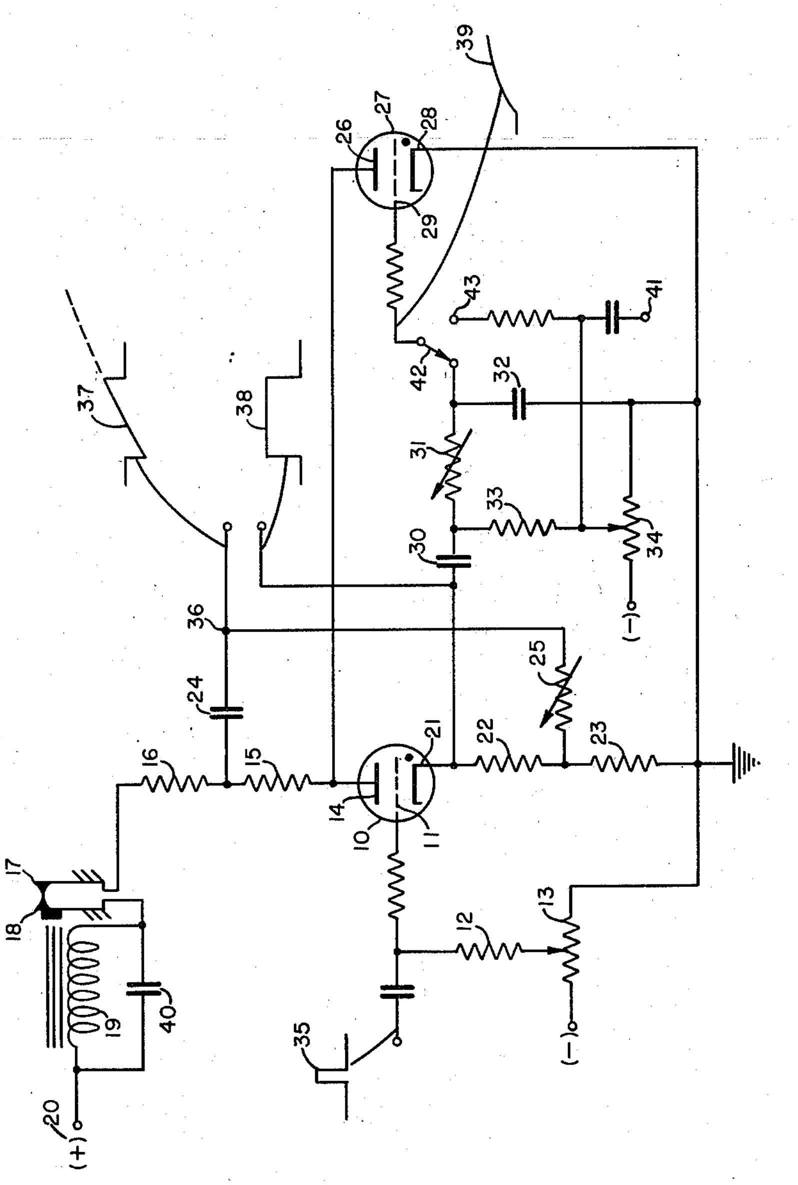
Inventor
ALBERT H. TAYLOR
By
Attorney Patented Aug. 22, 1950

2,519,413

UNITED STATES PATENT OFFICE 2,519,413

OSCILLOSCOPE SWEEP CIRCUIT

Albert H. Taylor, Prince Georges County, Md.

Application July 25, 1946, Serial No. 686,095

4 Claims. (Cl. 250—27)

(Granted under the act of March 3, 1883, as amended April 30, 1928; 370 O. G. 757)

This invention relates to sawtooth waveform generator circuits of the type particularly used in conjunction with cathode ray oscillographs and in particular to voltage generator circuits of the triggered type producing a voltage signal upon reception of a keying or trigger pulse signal.

In cathode ray oscillography, employing electrostatically deflected cathode ray tubes it frequently is desirable to employ amplifier tubes interposed between the sweep generation circuit and the deflection plates of the tube. Such amplifier circuits generally employ reactive type couplings and hence will not normally reproduce the average voltage level of an input signal. To permit such amplifiers to operate upon negative and positive going signals of equal amplitude it is customary to bias them at an operating point which will permit equal linearity of operation in both negative and positive directions. Thus the conventional type of sweep voltage starting from a first reference level and rising or falling toward a second reference level will actually employ only half of the linear output voltage capabilities of the amplifier, whether it be for negative or positive going signals. Where high-speed cathode ray tubes requiring large deflection voltages are employed, such a loss of one-half of the output voltage capabilities of the deflection amplifiers places a requirement that the deflection amplifiers themselves be capable of linear operation over very large output voltage ranges.

It is therefore an object of the present invention to provide a sweep voltage for an electrostatically deflected cathode ray tube driven by deflection amplifiers permitting the optimum use of the linear operating voltage range of the deflection amplifier.

Another object of the present invention is to provide a sweep voltage generator for producing a sawtooth voltage waveform having a zero average or D.-C. component.

Other and further objects and features of the present invention will become apparent upon a careful consideration of the accompanying drawings and detailed description.

The single figure of the drawing is a schematic diagram of a typical embodiment of the present invention, showing also typical waveforms taken to illustrate more fully the operation thereof.

In accordance with the general concepts of the present invention a sawtooth voltage generator system is provided for producing a sawtooth voltage waveform having zero average D.-C. level in response to a keying signal of regular or irregular recurrence frequency. In the first portion of the sweep, immediately following receipt of the keying pulse, the signal produced changes rapidly to a reference level having a first polarity with respect to the quiescent level. From this point, the voltage is caused to change at a slower rate in a substantially linearly manner toward a level of polarity opposite to that of the first level, passing through the quiescent voltage level at a time instant displaced from the start of the sweep by approximately half of the desired sweep duration. When the changing signal reaches a level equal in amplitude to the first level but of opposite polarity the linearly changing portion is interrupted and rapid return to the quiescent level occurs. Such a changing voltage is produced with an electron tube preferably possessing the characteristics of high conductivity. Tapped load resistances are placed in the anode and cathode circuits thereof. Upon initiation of conduction within the tube, the sudden drop in potential produced at the tapped point along the anode resistance is communicated through an A.-C. coupling circuit to an external terminal. This external terminal is also coupled via a D.-C. path to the tapped point of the cathode resistance so that in the quiescent state the output terminal is maintained at the D.-C. potential of the tap of the cathode resistor. Thus, after the initial drop in potential of the output terminal produced by the voltage change across the tapped portion of the anode resistance, the D.-C. path to the tapped portion of the cathode resistance causes the output terminal to begin a voltage excursion toward that of the tap of the cathode resistance. Conduction by the electron tube through the anode resistance however raises the potential of the cathode tap so that the return of the output terminal is toward a positive potential rather than the zero quiescent value. After the desired sweep duration has been realized an auxiliary time measuring mechanism produces an interruption in the flow of current through the electron tube resulting in a quick return of the tap on the anode resistance to its quiescent signal level bringing with it the potential of the output terminal.

With particular reference now to the figure, a gaseous electron tube 10 is shown which is maintained in a normally non-conducting condition by virtue of a negative potential applied to its grid 11 through resistance 12 from potentiometer 13. The anode 14 of tube 10 is connected to a positive supply potential through resistances 15, 16, the normally closed contacts 17, 18 of a relay having a coil 19 to a source of positive power supply 20. The circuit of cathode 21 is connected through resistances 22 and 23 to the ground potential which is the negative return of source 20. Connected to the junction of resistances 15 and 16 is a capacitance 24. Capacitance 24 is in series with resistance 25 which is in turn connected to the junction point between resistances 22 and 23.

Also connected to the anode 14 of tube 10 is the anode 26 of a second gaseous electron tube 27. The cathode 28 of tube 27 is returned to the negative or ground potential. The grid 29 of tube 27 is connected to the cathode 21 of tube 10 through a capacitance 30 and integrating circuit including resistance 31 and capacitance 32. Electron tube 27 is maintained in a normally non-conductive condition despite the application of voltage between anode 26 and cathode 28 by means of a negative potential supplied to grid 29 through resistance 33 and potentiometer 34. Upon application of a positive keying pulse as indicated by numeral 35 to the grid 11 of tube 10, conduction within tube 10 is initiated. The initiation of conduction within tube 10 produces an immediate drop in potential at the junction point of resistances 15 and 16 and a rise in potential at the junction of resistances 22 and 23. This potential drop is immediately communicated by capacitance 24 and the potential rise by resistance 25 to the junction point 36 of capacitance 24 and resistance 25. As tube 10 continues to conduct, the increased positive potential at the junction between resistances 22 and 23 causes a gradual charge of capacitance 24 through resistance 25 resulting in a gradual rise of potential at the junction 36, as indicated in waveform 37. As capacitance 24 continues to charge, the potential at point 36 rises above the quiescent zero potential because of the voltage drop across resistance 23. The positive pedestal type pulse 38 produced at the cathode 21 of tube 10 because of the voltage drop across resistances 22 and 23 is integrated by resistance 31 and capacitance 32 to produce the sloping waveform 39. Eventually this sloping waveform raises the grid 29 to a potential sufficient to permit tube 27 to become conductive. Conduction by tube 27 produces an immediate drop in potential at anode 14 of tube 10, which by proper selection of the resistances 15, 16, 22, 23, will result in an interruption in the conduction by tube 10 and subsequent deionization thereof, producing a termination of the positive pedestal signal 38. Subsequently conduction by tube 27 is interrupted by relay 19 which is actuated upon simultaneous conduction of tubes 10 and 27 to open contacts 17 and 18 and thus remove the anode supply voltage from the two tubes. Relay coil 19 is so proportioned with respect to capacitance 40 that chattering of the contacts 17, 18, does not occur.

The positive pedestal type pulse 38 produced at the cathode 21 is ideal for intensity control of a cathode ray tube associated therewith. This pulse would in practice be supplied to the grid of the cathode ray tube to permit the flow of electrons to the screen only during the portion of time during which the heavy portion of the sweep voltage 37 occurs.

Time measurement by means of this circuit is also possible with a second input terminal 41. A positive pulse supplied to grid 29 with switch arm 42 in contact with 43 can produce termination of the sweep voltage and of the pedestal voltage 38 at any time prior to its natural conclusion as heretofore mentioned. It is thus possible to measure quite closely the time interval between a pair of signals as supplied to grid 11 and terminal 41.

Since some adjustment of the sweep duration is desirable resistances 25 and 31 in the time constant circuits are made variable. Thus it is possible to increase the time duration of the sweep voltage 37 by increasing the size of resistance 25 and similarly increasing the size of resistance 31 so that conduction by tube 27 is retarded. In practice resistance 31 is adjusted to produce the desired duration of the pedestal pulse 38. Resistance 25 is adjusted so that the displacement produced at the initiation of waveform 37 is equal in amplitude to the displacement in the opposite direction existing at the time of termination of the pedestal pulse 38.

From the foregoing discussion it is apparent that considerable modification of the features of the present invention is possible and while the device herein described and the form of apparatus for the operation thereof constitutes a preferred embodiment of the invention it is to be understood that the invention is not limited to this precise device and form of apparatus and that changes may be made therein without departing from the scope of the invention which is defined in the appended claims.

The invention described herein may be manufactured and used by or for the Government of the United States of America for governmental purposes without the payment of any royalties thereon or therefor.

What is claimed is:

1. A sweep voltage generator for producing a balanced output, comprising; an electron tube having anode, cathode and control grid electrodes, biasing means maintaining said electron tube in a normally non-conductive state, tapped anode and cathode load impedances for said electron tube, a direct current source connected across said load impedances an output circuit, trigger signal means coupled to said control grid electrode operative to initiate the conductive state in said electron tube whereby voltages are developed across said load impedances, capacitive means coupling said output circuit to the tap on the anode load impedance, resistive coupling means connecting said output circuit to the tapped point on the cathode load impedance, and time measuring means coupling said cathode to said anode operative to interrupt the conductive condition in said electron tube after a selected duration thereof, in response to the voltage developed across said cathode load impedance.

2. A sweep voltage generator for producing a balanced output comprising; a first electron tube having anode, cathode and control grid electrodes, biasing means maintaining said first electron tube in a normally non-conductive condition, tapped anode and cathode load impedances for said electron tube, a direct current source connected across said load impedances an output circuit, trigger signal means coupled to said control grid electrode operative to initiate the conductive state in said electron tube whereby voltages are developed across said load impedances, time constant coupling means supplying voltage signals from the tapped points of said load impedances to the output circuit, a second electron tube having anode, cathode and control grid electrodes, the anode of said second tube being connected to the anode of said first tube, a time delay circuit coupling the cathode of the first electron tube to the control grid of the second electron tube whereby conduction in said second electron tube is initiated a selected interval of time after the initiation of conduction in the first tube, and means interrupting the flow of current in both electron tubes, responsive to the flow of current in said second tube.

3. A sweep generator for producing a balanced output comprising, a voltage dividing network including a pair of resistance means and a first switching means interposed between and serially connecting said resistance means, a direct current source connected across said voltage dividing network, an output terminal, resistance coupling means connecting one of said pair of resistance means to said output terminal, capacitive coupling means connecting the other of said pair of resistance means to said output terminal, said coupling means being operative to couple out of phase voltages from said pair of resistance means to said output terminal in a predetermined time relationship, a second switching means connected in parallel with said first switching means and said other resistance means operative upon actuation to provide a short circuit thereacross, actuating means for said second switching means including a time delay means connected to said other resistance means operative to actuate said second switching means in delayed response to the voltage developed across said other resistance means.

4. A sweep generator for producing a balanced output comprising, a voltage dividing network including a pair of resistance means and a switching means interposed between and serially connecting said resistance means, a direct current source connected across said voltage dividing network, an output terminal, resistance coupling means connecting an intermediate point in one of said pair of resistance means to said output terminal, capacitive coupling means connecting an intermediate point in the other of said pair of resistance means to said output terminal, said coupling means being operative to couple out of phase voltages from said pair of resistance means to said output terminal in a predetermined time relationship, means maintaining said switching means in a normally open condition, actuating means for closing the circuit through said switching means, and time measuring means within said switching means operative to open said circuit at a selected time interval after the closing thereof.

ALBERT H. TAYLOR.

REFERENCES CITED

The following references are of record in the file of this patent:

UNITED STATES PATENTS

| Number | Name | Date |
|---|---|---|
| 2,144,779 | Schlesinger | Jan. 24, 1939 |
| 2,157,434 | Potter | May 9, 1939 |
| 2,443,922 | Moore | June 22, 1948 |